United States Patent Office 3,373,420
Patented Mar. 12, 1968

3,373,420
MOVABLE CONTROL BOXES FOR CONTROLLING MACHINE TOOLS
Rene Deflandre, Paris, France, assignor to Societe DEREFA, Etablissement pour le Developpement, Recherches et Fabrications Industrielles, Vaduz, Liechtenstein
Filed Apr. 20, 1965, Ser. No. 449,564
Claims priority, application France, Apr. 28, 1964, 972,565
8 Claims. (Cl. 340—324)

ABSTRACT OF THE DISCLOSURE

This invention is concerned with a suspended machine tool control assembly composed of two parts, a first part that is fixed to the end of a flexible suspension member and carries certain ancillary apparatus for checking and regulating members in the machine, and a second part that is rotatably supported by the first part and carries the apparatus for controlling the machine members.

The invention

The present invention relates to movable control consoles for controlling machine tools, carried by a support member fixed to the lower extremity of a flexible suspension member, such as a chain or cable and, in more particular such control consoles capable of rotation about a vertical axis, with respect to the support member which carries them.

Control consoles of this type are very convenient to use on modern machinery, since they enable the operator remotely to control all the members of the machine, wherever he may be standing in relation to the machine, and whatever his orientation may be, since he may cause the console to rotate about its vertical axis so as to guide it so that it is always opposite him.

However, with technological progress, numerous ancillary apparatus for checking, adjusting, regulating and controlling has been added, such as for example electronic counters for indicating the movements of the different members of the machine, so as accurately to check for example the movements of the part or of the tool along three axes of rectangular co-ordinates. It goes without saying that such ancillary apparatus, and particularly the electronic counters referred to, necessitates for its operation, a very large number of electrical supply and transmission cables, therefore, if all this ancillary apparatus are incorporated into a rotatable console, not only is the bulk of the latter considerably increased, but a new difficulty is met with. In fact, if no particular system is provided for this purpose, a bundle of a considerable number of cables will be found necessary which bundle cannot withstand in practice the stress and strains which a conventionally-sized cable harness can withstand, when the console is made to rotate about its vertical axis. Moreover, if, between the console and its support member there is provided a rotatable brush system, to carry out the necessary electrical connections between the cables, mounted respectively in the console and in the support member, it would be necessary when a very large number of supplementary cables is needed for the operation of the ancillary apparatus in question, to multiply the number of the wiper brushes in a proportion such that it would be necessary to produce a complicated, cumbersome and very costly assembly, without mentioning the faults inherent in the friction systems, capable of introducing errors into the operation of the counters, or breakdowns in the different apparatus.

It is an object of the invention to provide an improved system of control consoles, to which may be added a large amount of ancillary apparatus and equipment, whilst avoiding or minimising the abovementioned disadvantages.

To this end, the invention consists in a console for controlling a machine tool carried by a support member secured to the lower end of a flexible suspension member, said control console being mounted so as to be able to rotate about a vertical axis with respect to said support member, wherein the support member is constituted by a unit containing ancillary apparatus, connected to the machine tool by means of flexible multi-conductor cables which pass through the upper wall of said unit and follow the flexible suspension member of the support member, the cables connected to the various apparatus in the rotatable control console passing vertically through said unit.

Due to this particular structure, practically without modifying the rotatable control console, a non-rotatable unit is connected to the console, and in which may be mounted a large amount of ancillary apparatus, without there resulting any disadvantages, since the cables connected to such ancillary apparatus do not have to undergo the same amount of torsion and other stresses as the smaller number of cables which are connected to the rotatable console immediately below said unit.

The upper part of the rotatable control console may be extended into the ancillary apparatus unit by means of a sleeve through which bars the cables terminating in the console.

The ancillary apparatus may, in particular, comprise electronic counters for indicating the movements of the members of the machine.

Such counters incorporate lamps for indicating the counts and these lamps may be arranged on the front surface of the unit, whilst, on at least one of the side surfaces thereof, are arranged switches for controlling the display of the counters and for returning said counters to zero.

These lamps may be grouped in lines corresponding respectively to the different movements to be checked and opposite each line, a stylised outline of the machine causes the indication of the corresponding moving member of the machine to be distinctly indicated.

Each outline of the machine is located near a side edge of the front surface of the unit and the switches corresponding to the counters of the line in question are located on the side surface adjacent said unit at the height of said outline.

Tactile guides, preferably in the shape of small bars forming partitions, may separate the lines of control buttons of the switches.

In order that the invention may be more clearly understood, reference will now be made to the accompanying drawings which show one embodiment thereof by way of example, and in which.

Figure 1:
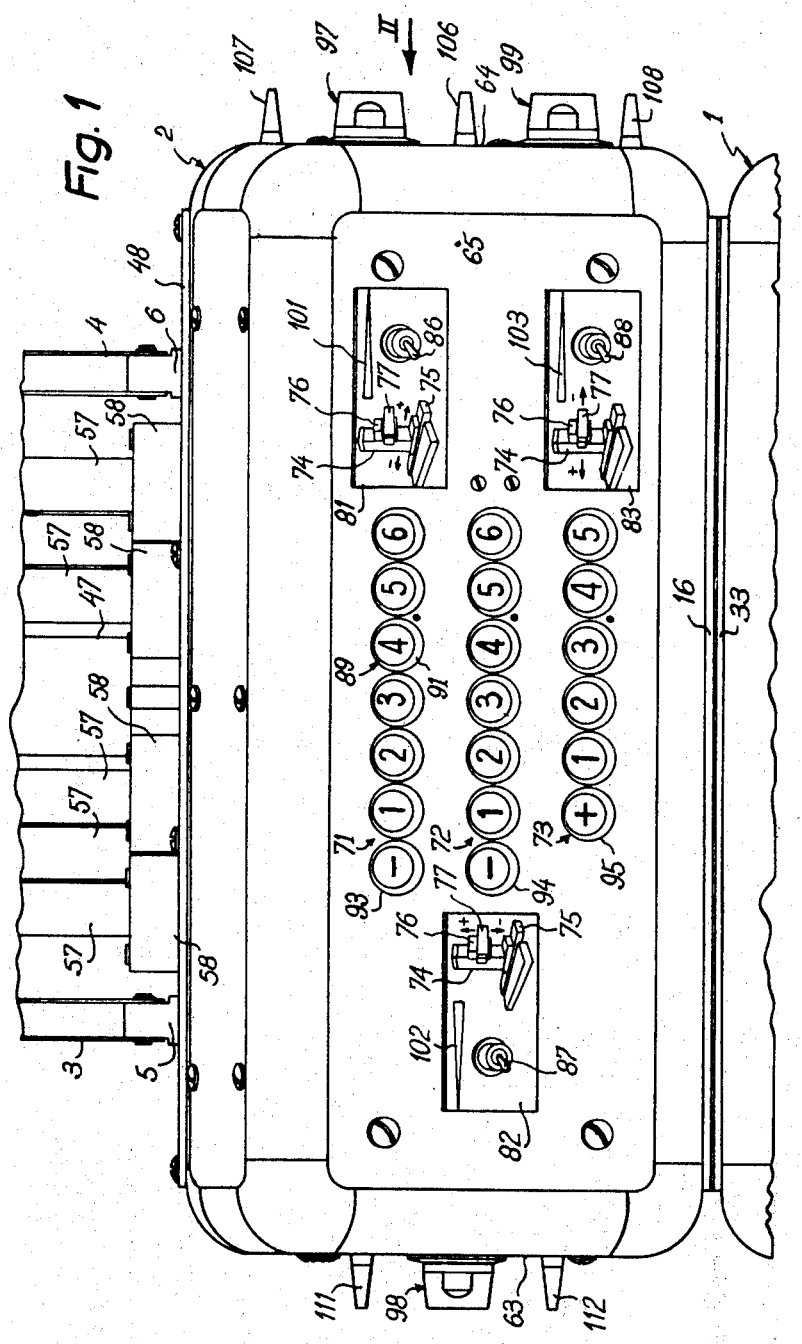
FIGURE 1 shows a front view of the console assembly, the lower part of which, constituting the rotatable part of the console, is only partially shown.

Referring now to the drawings, these show the assembly of a control and checking console for a machine tool, such as for example a milling/boring machine, and comprising a control console 1 carrying control apparatus such as shown in U.S. Patents No. 2,669,214, dated Feb. 16, 1954, and No. 2,700,313, dated Jan. 25, 1955, and an ancillary apparatus unit 2.

Figure 3:
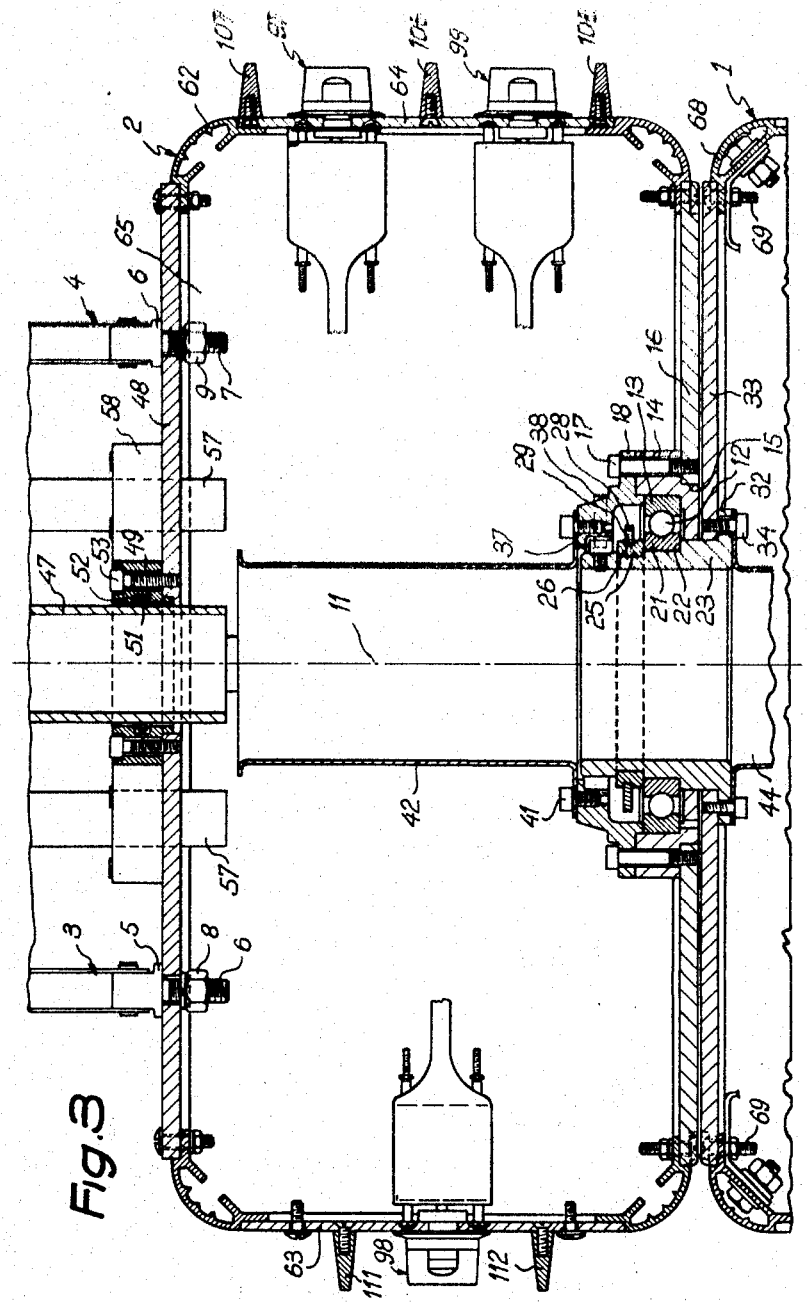
FIGURE 3 shows, to a larger scale, a section along the line III—III of FIGURE 2.

The unit 2 is attached directly to the lower end of a flexible suspension member, and as is shown more clearly in FIG. 3 of the drawings, is constituted in the embodiment by two chains 3, 4 by means of straps 5 provided with threaded rod-ends 7 on which are screwed nuts 8, 9. The control console 1 is supported by the unit 2, so as to be able to rotate about the vertical axis 11 of the assembly, on means which include a ball-bearing 12.

The external race or ring 13 of the ball-bearing 12 is mounted in a casing 14 centrally located in a circular opening 15 formed in the base 16 of the unit 2 and is tightened against said base by means of screws 17 which serve at the same time to fix on to said casing a cover 18 for holding the ball race. The internal race or ring 21 of the ball-bearing is held against a shoulder 22 of a collar 23 integral with the rotatable console 1, by means of a ring 25 in two parts lodged in an annular groove 26 in said collar and held in place by means of a flexible abutment 28 itself lodged in an annular groove 29 in the external cylindrical surface of the two-piece ring.

The collar 23 has a flange 32 fixed against the internal surface of the upper part 33 of the console 1 by means of screws 34.

The rotational movement of the console 1 with respect to the unit 2, is limited to a little less than 180° by means of a screw 37 mounted radially in the upper part of the collar 23 and the head of which is arranged to come into contact with a catch 38 fitted into a corresponding radial hole of the cover 18.

On the upper surface of the cover 18 is fixed, by means of screws 41, a turned back edge forming a flange of an axial sleeve 42, whilst against the lower surface of the collar 32, a turned back edge forming a flange of a sleeve 44 which is also coaxial to said collar, is tightened by means of screws 34. The two sleeves 42 and 44 serve as the direct passage for the bundle of cables which connect the machine to the different members of the rotatable control console 1. This bundle of cables passes through a flexible sheath 47 which traverses the upper part 48 of the upper unit 2, through a gland 49 provided with a sealed toric joint 51 lodged in a corresponding annular groove 52 of said gland. The gland 49 is fixed on the upper part 48 of the unit by means of screws 53.

All the apparatus mounted in the unit 2 are connected to the machine by means of cables, which pass into one of the six sheaths, such as 57, which pass through the upper part 48 of said unit through openings provided with glands such as 58 in which a sealed joint similar to the sealed joint 51 is also mounted on the central sheath 47.

The unit 2 is essentially constituted by a cage, the edges of which are formed by profiled sections such as 62 against which are fixed, by means of screws, plates 16, which forms the lower part of the unit, the plate 48 which forms the upper part, the two side plates 63, 64 which form these side walls, a front plate 65 and a rear plate 66.

The rotatable control console 1 is constituted by a cage or frame, the edges of which are formed by profiled sections such as 68, and the different surfaces of which are also constituted by plates which are threaded and fixed to said disc by means of screws such as the screws 69 for fixing the upper plate 33 (FIGURE 3).

In the embodiment, the ancillary apparatus mounted in the unit 2 are electronic counters of known construction, three in number, collectively designated by 71, 72, 73 in FIG. 1 of the drawings, and intended to check in a known manner, respectively the movements of the mounting 74 on the bench 75, of the foot 76 on the mounting 74 and of the headstock 77 on the foot 76, of a milling/boring machine, these three members of which are schematically shown on an outline of the assembly of the machine reproduced on three small corresponding plates 81, 82, 83 fixed on the plate 65 forming the front surface of said unit.

Each of these three plates is located on the level of the corresponding counter and on each of them, the member of the machine, the counter in question of which indicates the position, is neatly detached from the upper members. Three switches 86, 87, 88 respectively mounted on these three plates, serve to put the corresponding counters out of circuit, when these latter are not required.

The three electronic counters are fixed against the internal surface of the front plate 65, of the unit 2, in such a way that luminous figures, such as 89, of said counters, are visible through tapered holes 91 in said plate, moreover, this plate 65 is upwardly and forwardly inclined, so as to allow, in combination with the taper of said holes, a very good, direct visibility of the figures of the counters, whilst avoiding that any impinging light may harm the clearness of the luminous figures. A luminous lamp for each counter 93, 94, 95, respectively, serves to indicate the direction of the corresponding movement by the appearance of the "+" sign or the "—" sign in the said lamps.

Figure 2:
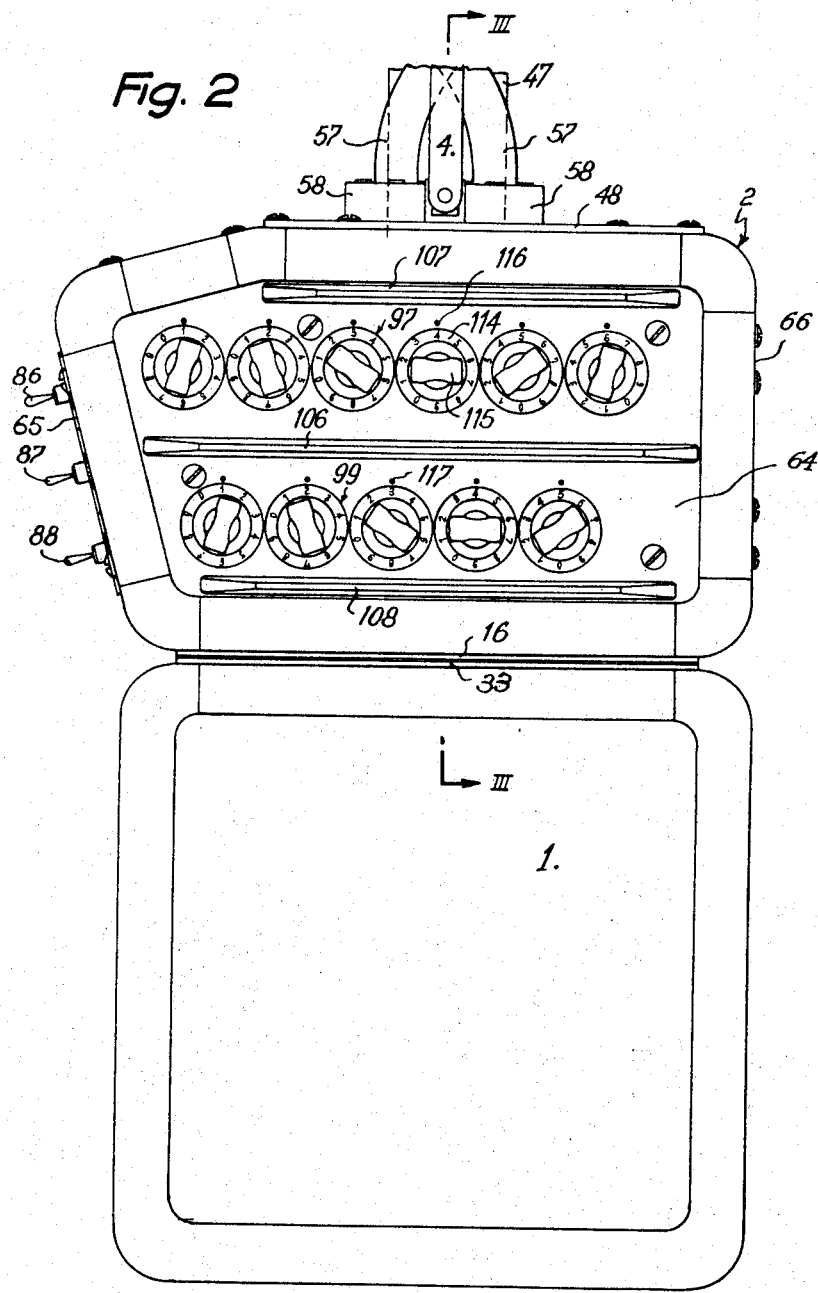
FIGURE 2 shows a side view seen in the direction of the arrow II of FIGURE 1.

The indications of the three electronic counters 71, 72, 73 may be displayed respectively by means of three lines of switches designated collectively by 97, 98, 99 in FIGS. 1-3 of the drawings, the line of intermediate switches 98 being located on the left hand surface 63 of the unit, whilst the other two lines are located on the side surface 64 on the right thereof. These three lines of switches are located respectively at the level of three reference arrows 101, 102, 103, carried by the three small pates of corresponding outlines 81, 82, 83, respectively, so as to create an instinctive control of said counters. For the purpose of avoiding confusion, the two lines of switches 97, 99 are separated by a partition 106 and are bordered by two other partitions 107, 108 and in a similar way, the line of switches 98 is bordered by two partitions 111, 112. All these partitions are of height which is slightly greater than the height of the buttons, they serve as tactile guides for the operator and moreover they serve as members for protecting against shocks or contacts capable of causing deterioration or mis-adjustment in the switches.

The number of lamps in each counter, i.e., length of the counters, obviously depend on the maximum length of the path of the member to be checked. Each control switch corresponds, in the same order as on the counters, to each of the figures constituting the number which represents the distance covered by the corresponding member of the machine. The direction of the movements is controlled by the lower console 1.

The display of the sizes is effected by rotating the switches so as to place the figure, selected from those inscribed on the flange 114, for example of each button 115, opposite a corresponding fixed reference such as 116, for example (FIGURE 2).

The desired movement is obtained by setting into motion the corresponding movement of the machine, by the control console 1 until all the displayed figures return to zero.

The return to zero of the counters may be ensured without effecting movement, by displaying all the zero figures by means of the corresponding switches.

By removing the rear plate 66 of the unit, all the apparatus mounted in this latter is easily accessible.

Therefore in addition to the electronic counters described above, or even in place of these, any other desired apparatus such as voltmeters, ammeters, signalling lamps, loudspeaking alarm apparatus or even apparatus for acoustic connection, may be mounted in the unit.

I claim:
1. A control console assembly for controlling a machine tool, comprising a unitary control console including means for controlling members of said machine tool, a support member carrying said console, a flexible suspension member secured to an end of which said support member is secured, means for mounting said control console for rotation about a vertical axis with respect to said support member, said support member including a unitary container having an upper wall and ancillary apparatus contained therein, flexible multi-conductor electrical cables for said ancillary apparatus passing through the upper wall of said unitary container to said machine tool, said cables following said flexible suspension member, and cables connected to said control means within said console, said latter cables passing vertically through said unitary container of said support member.

2. A control console assembly as set forth in claim 1, said console has an upper tubular part extending up into said unitary container and through which pass said latter cables.

3. A control console as set forth in claim 1, wherein said ancillary apparatus comprises electronic counters for indicating the movements of such members of said machine tool.

4. A control console as set forth in claim 3, wherein said counters include lamps for indicating the positions of said machine members, means for mounting said lamps behind an apertured front panel of said unitary container and switch means mounted on at least one side wall of said unitary container for controlling the display of said lamps and for returning such displays to zero condition.

5. A control console as set forth in claim 4, wherein said lamps are grouped in lines corresponding respectively to the different positional movements to be checked, and a stylised outline of said machine tool opposite each of said lines to give a distinct indication of the corresponding moving members of said machine tool.

6. A control console assembly for controlling a machine tool, comprising a flexible suspension member, a first console part for ancillary apparatus dependent from and fixed to an end of said suspension member, a second console part for apparatus to control the members of said machine tool carried by and dependent from said first part, means rotatably connecting said second console part to said first console part, first means on said first console part for the passage into such part of electrical cables for the ancillary apparatus, and second means associated with said first console part for the passage through such part and into said second console part of cables for the control apparatus.

7. A control console as set forth in claim 4, wherein control buttons are mounted on said side wall in lines each of said button controlling one of said switches and wherein tactile guide members separated said lines of switches.

8. A control console as set forth in claim 7, wherein said tactile guide members consist of small bars or rods, said bars or rods also forming partitions.

References Cited
UNITED STATES PATENTS

| | | | |
|---|---|---|---|
| 2,940,366 | 6/1960 | Daugherty | 212—21 |
| 3,039,029 | 6/1962 | Spafford | 212—21 |
| 3,198,078 | 8/1965 | Schurger et al. | 318—17 |
| 3,210,608 | 10/1965 | Appleton | 317—99 |

FOREIGN PATENTS

| | | |
|---|---|---|
| 1,085,310 | 7/1960 | Germany. |

JOHN W. CALDWELL, *Primary Examiner.*

NEIL C. READ, *Examiner.*

A. J. KASPER, *Assistant Examiner.*